(12) United States Patent
Liu

(10) Patent No.: US 8,164,893 B2
(45) Date of Patent: Apr. 24, 2012

(54) HARD DISK DRIVE TRAY AND COMPUTER HAVING THE SAME

(75) Inventor: Lei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 209 days.

(21) Appl. No.: 12/761,421

(22) Filed: Apr. 16, 2010

(65) Prior Publication Data

US 2011/0096491 A1 Apr. 28, 2011

(30) Foreign Application Priority Data

Oct. 27, 2009 (CN) .......................... 2009 1 0308904

(51) Int. Cl.
 *G06F 1/16* (2006.01)
(52) U.S. Cl. ................................................. 361/679.33

(58) Field of Classification Search ............. 361/679.33, 361/724–727
See application file for complete search history.

(56) References Cited

U.S. PATENT DOCUMENTS

| | | | | |
|---|---|---|---|---|
| 7,149,081 | B2* | 12/2006 | Chen et al. | 361/679.36 |
| 7,430,123 | B2* | 9/2008 | Xiao et al. | 361/724 |
| 7,480,135 | B2* | 1/2009 | Chen et al. | 361/679.28 |
| 2006/0232925 | A1* | 10/2006 | Han et al. | 361/685 |
| 2011/0267762 | A1* | 11/2011 | Sun | 361/679.33 |

\* cited by examiner

*Primary Examiner* — Lisa Lea Edmonds
(74) *Attorney, Agent, or Firm* — Altis Law Group, Inc.

(57) ABSTRACT

A computer includes a cabinet, a plurality of hard disk drives (HDDs), and a plurality of HDD trays. The cabinet defines a plurality of groups of screw holes therethrough. Each of the HDDs defines a group of screw holes in the bottom surface thereof respectively. Each of the HDD trays includes a loading bracket and a plurality of supporters, and the supporters extending outward from the loading bracket; the loading bracket defines a plurality of arrays of screw holes, each array of screw holes having a unique size to allow a corresponding size of HDD to be secured thereon, the supporters define a group of screw holes corresponding to the screw holes defined on the cabinet.

9 Claims, 3 Drawing Sheets

HARD DISK DRIVE TRAY AND COMPUTER HAVING THE SAME

BACKGROUND

1. Technical Field

The present disclosure relates to a hard disk drive (HDD) tray and a computer having the HDD trays.

2. Description of Related Art

Conventional HDD trays are designed to secure HDDs thereto. More than one type of HDD is available for computers and it is common to frequently upgrade the HDDs in the computers. However, one type (i.e., size) of HDD tray just can secure corresponding type of HDD. Therefore, the upgrading of HDDs becomes inconvenient if a computer employs the conventional HDD trays.

Therefore, it is desirable to provide an HDD tray and a computer, which can overcome the above-mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Embodiments of the disclosure are now described in detail with reference to the drawings.

Figure 1:
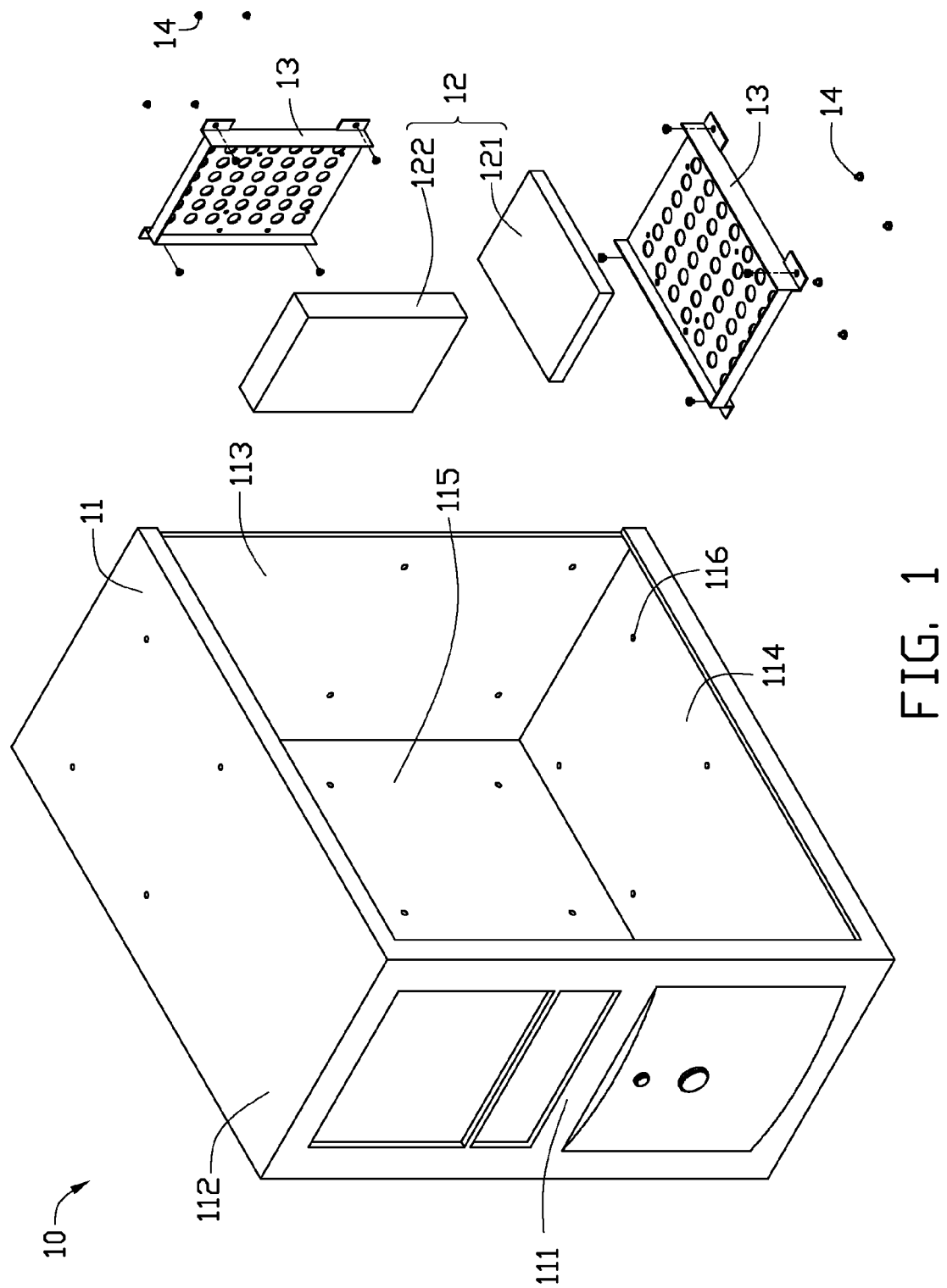
FIG. 1 is an exploded, isometric view of a computer, according to one embodiment.

Referring to the FIG. 1, a computer 10, according to one exemplary embodiment, includes a cabinet 11, two hard disk drives (HDDs) 12, two HDD trays 13, and a plurality of screws 14. Some essential components, such as a CPU, and a memory and other components are not detailed herein as they are well known in the art.

The cabinet 11 is a hollow cubic configuration, and includes a front plate 111, a top plate 112, a rear plate 113, a bottom plate 114, and a pair of first side plates 115 (only one is shown in FIG. 1). The front plate 111, the top plate 112, the rear plate 113, the bottom plate 114 perpendicularly connect to the edges of the first side plates 115.

The front plate 111 defines a plurality of holes for installation of buttons, e.g., a power button and/or a reset button, and accessing openings for accessing a variety of electronic accessories, such as CD-ROM drives, floppy drives, or USB drives from the cabinet 11.

The top plate 112, the rear plate 113, the bottom plate 114, and the first side plate 115 respectively define a plurality of first screw holes 116 therethrough. Four first screw holes 116 are grouped in each of the plates 112, 113, 114 or 115, and are arranged in a 2×2 array with pitches 130 mm and 116 mm in two dimensional directions of the array respectively. The first screw holes 116 are positioned in the area where they will not impede on other electronic accessories assembled in the cabinet 11.

Figure 2:
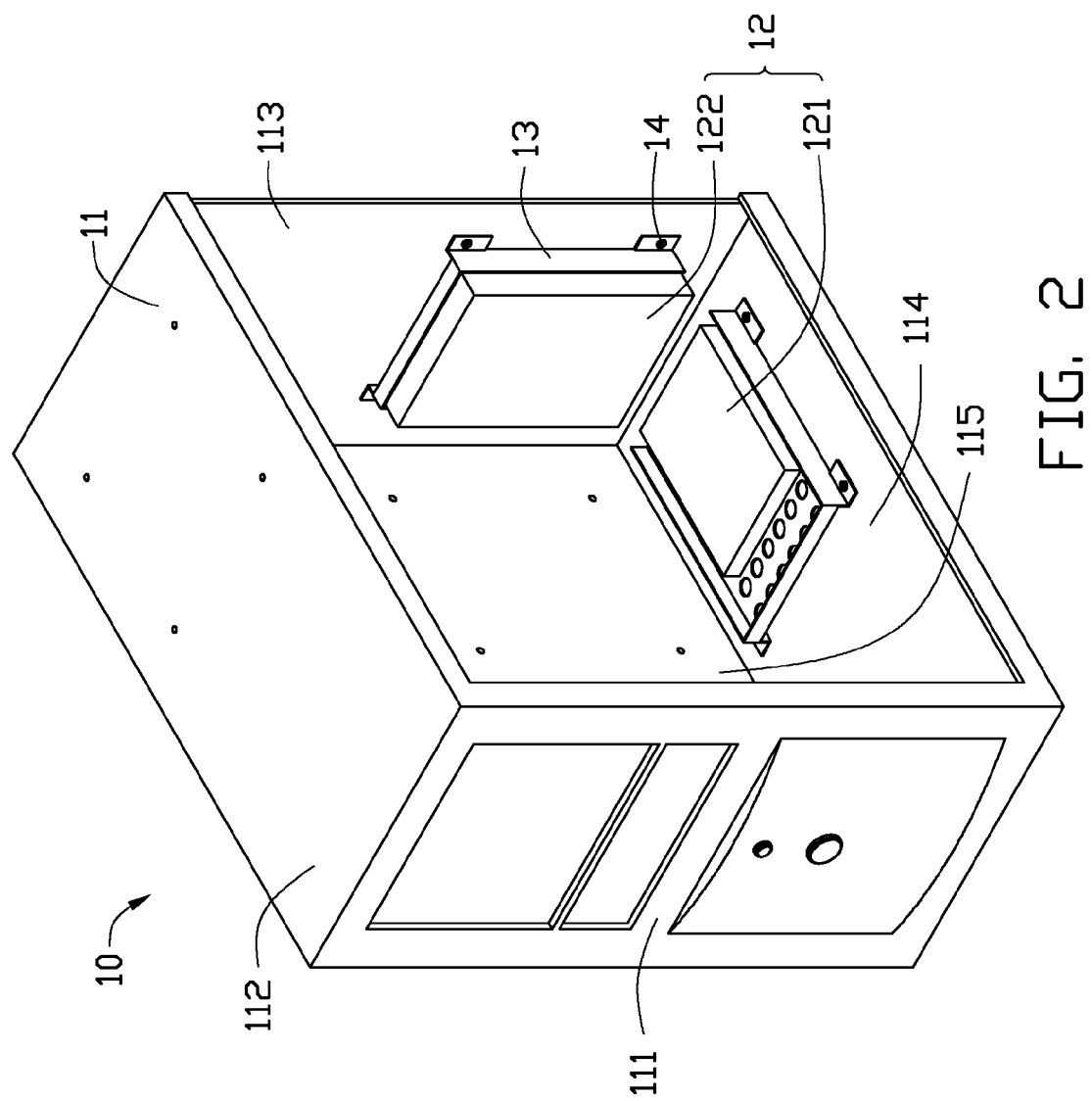
FIG. 2 is an assembled, isometric view of the computer of FIG. 1.

Referring to FIG. 2, the HDDs 12 include a first HDD 121 and a second HDD 122. In this embodiment, the first HDD 121 is a 2.5 inch HDD, and the length and the width are about 100.2 mm and 70.0 mm respectively. The second HDD 122 is a 3.5 inch HDD, and the length and the width are about 147.0 mm and 101.3 mm respectively. The first HDD 121 defines a group of four second screw holes (not shown) in the bottom surface thereof. The second screw holes are arranged in a 2×2 array with pitches about 76.61 mm and 61.72 mm in two dimensional directions of the array respectively. The second HDD 122 defines a group of four third screw holes (not shown) in the bottom surface thereof. The third screw holes are arranged in a 2×2 array with a pitch of about 95.25 mm and 44.45 mm in two dimensional directions of the array respectively.

It is noteworthy that in order to assemble the HDDs 12 differently, the pitch of the second screw holes and the third screw holes can be redesigned depending on needs.

Figure 3:
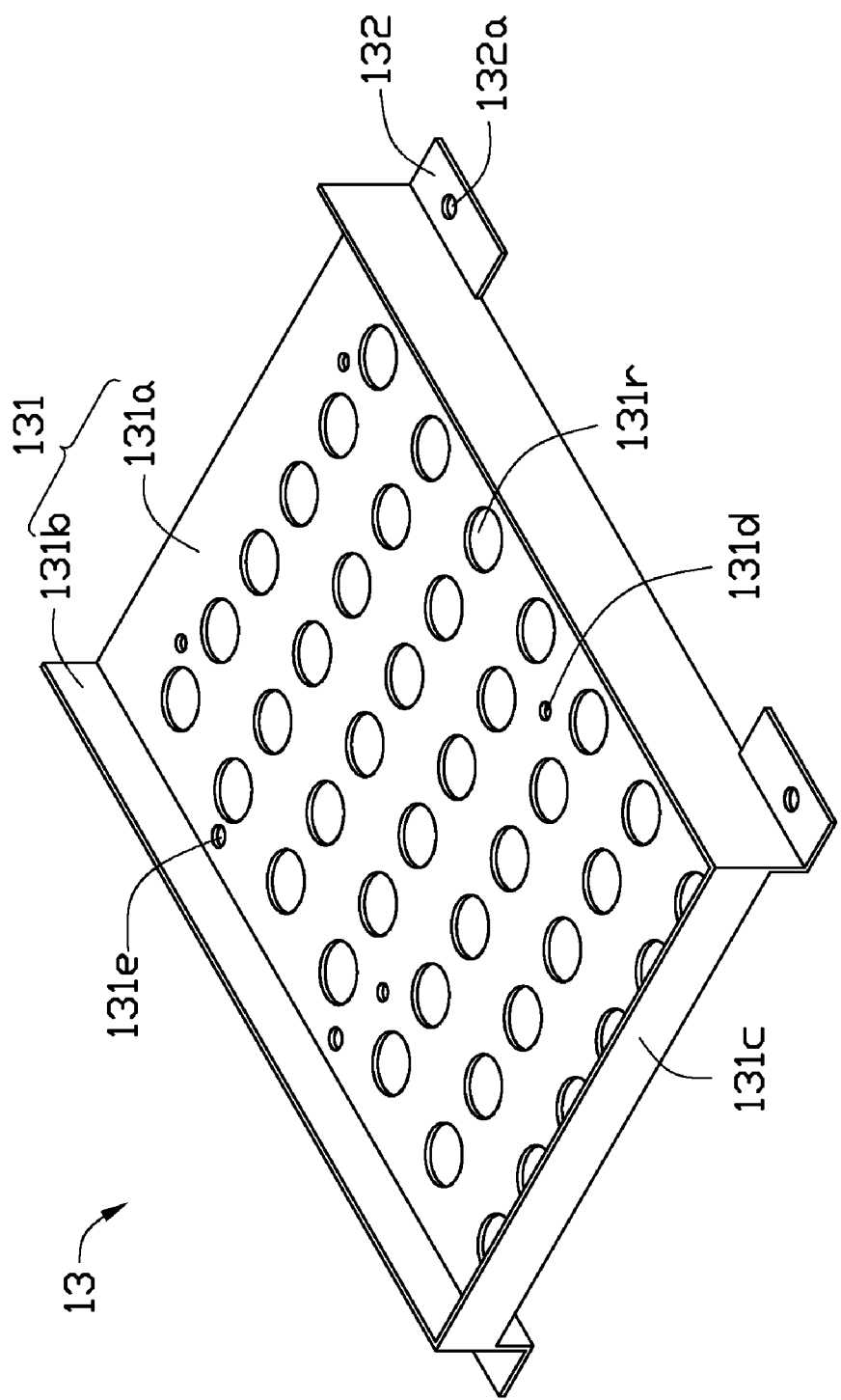
FIG. 3 is an isometric view of a HDD tray of the computer of FIG. 1.

Referring to FIG. 3, each of the HDD trays 13 includes a loading bracket 131 and four supporters 132. The loading bracket 131 is cubic. The four supporters 132 extend outward from the loading bracket 131 to allow the loading bracket 131 to be secured to the cabinet 11.

The loading bracket 131 includes a loading plate 131a, two second side plates 131b, and a third side plate 131c. The loading plate 131a is generally rectangular. The two second side plates 131b are perpendicularly disposed on two sides of the loading plate 131a correspondingly. The third side plate 131c extends upward from one side of the loading plate 131a and connects between the two second side plates 131b. In this embodiment, the distance between two second side plates 132b is about 103.61 mm, and the distance between the third side plate 131c and the corresponded side of the loading plate 131a is about 150.0 mm.

The loading plate 131a is a rectangular plate, and defines a plurality of heat-dissipating holes 131r. The heat-dissipating holes 131r are circular, and are arrayed in the loading plate 131a in a regular matrix. The loading plate 131a defines a group of four fourth screw holes 131d and a group of four fifth screw holes 131e. The fourth screw holes 131d are arranged in a 2×2 array with pitches the same as those of the second screw holes. The fifth screw holes 131e are arranged in a 2×2 array with pitches the same as those of the third screw holes. The fourth screw holes 131d and the fifth screw holes 131r are adjacent to the second side plates 131b.

It is noteworthy that in order to assemble other type of HDDs 12, the other pitches of the screw holes can be defined on the loading plate 131a.

Each of the supporters 132 is a rectangular plate, and defines a sixth screwed hole 132a therein. Each two supporters 132 extend upward from two ends of the bottom of a corresponding second side plate 131b respectively. The supporters 132 and the loading plate 131a are disposed on two opposite surfaces of the second side plates 131b, and there is a distance between the supporters 132 and the loading plate 131a. Four sixth screw holes 132a are grouped, and are arranged in a 2×2 array with pitches the same as those of the first screw holes 116.

When the computer 10 needs to expand a first HDD 121 or a second HDD 122. The first HDD 121 is fixed on the HDD tray 13 by four screws 14 screwed through the second screw holes and the fourth screw holes 131d, or the second HDD 122 is fixed on the HDD tray 13 by four screws 14 screwed through the third screw holes and the fifth screw holes 131r. Then, the HDD tray 13 assembled to the first HDD 121 or the second HDD 122 is fixed on the top plate 112, the rear plate 113, the bottom plate 114, or the first side plate 115 by the four screws 14 screwed through the sixth screw holes 132a and the first screw holes 116.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A computer, comprising:
   a cabinet defining a plurality of groups of screw holes therethrough;
   a plurality of hard disk drives (HDDs) each defining a group of screw holes in the bottom surface thereof respectively; and
   a plurality of HDD trays, each of the HDD trays comprising a loading bracket and a plurality of supporters, and the supporters extending outward from the loading bracket; the loading bracket defining a plurality of arrays of screw holes, each array of screw holes having a unique size to allow a corresponding size of HDD to be secured thereon, the supporters define a group of screw holes corresponding to the screw holes defined on the cabinet.

2. The computer in claim 1, wherein the cabinet comprises a first side plate and a front plate, a top plate, a rear plate, and a bottom plate perpendicularly connect to the edges of the first side plate; the top plate, the rear plate, the bottom plate, and the first side plate define a group of first screw holes respectively.

3. The computer in claim 1, wherein the loading bracket comprising a loading plate, two second side plates, and a third side plate; wherein the two second side plates are perpendicularly disposed on two sides of the loading plate correspondingly, the third side plate extends upward from one side of the loading plate and connects between the two second side plates.

4. The computer in claim 1, wherein each two supporters extend upward from two side of the bottom of a corresponding second side plate respectively.

5. The computer in claim 4, wherein the supporters and the loading plate are disposed on two opposite surfaces of the second side plates, and there is a distance between the supporters and the loading plate.

6. A HDD tray, comprising:
   a loading bracket comprising a loading plate for supporting a HDD thereon, the loading plate defining a plurality of arrays of screw holes, each array of screw holes having a unique size to allow a corresponding size of HDD to be secured thereto; and;
   a plurality of supporting extending outward from the loading bracket to allow the loading bracket to be secured to a cabinet of a computer.

7. The HDD tray in claim 6, wherein the loading bracket comprising a loading plate, two parallel second side plates, and a third side plate; the two second side plates perpendicularly disposed on two opposite and parallel edges of the loading plate correspondingly, the third side plate perpendicularly extending upward from an edge of perpendicularly connecting the two second side plates.

8. The HDD tray in claim 7, wherein each two supporters extending upward from two end of the bottom of a corresponding second side plate respectively.

9. The HDD tray in claim 8, wherein the supporters and the loading plate are disposed on two opposite surfaces of the second side plates, and there is a distance between the supporters and the loading plate.

* * * * *